United States Patent [19]
Jeenicke

[11] Patent Number: 4,762,109
[45] Date of Patent: Aug. 9, 1988

[54] DEVICE FOR AND METHOD OF AFFECTING CONTROL OF OPERATIONAL MAGNITUDES OF INTERNAL COMBUSTION ENGINES HAVING EXHAUST GAS CIRCULATION

[75] Inventor: Edmund Jeenicke, Schwieberdingen, Fed. Rep. of Germany

[73] Assignee: Robert Bosch GmbH, Stuttgart, Fed. Rep. of Germany

[21] Appl. No.: 930,406

[22] PCT Filed: Sep. 11, 1985

[86] PCT No.: PCT/DE85/00316
§ 371 Date: Nov. 21, 1986
§ 102(e) Date: Nov. 21, 1986

[87] PCT Pub. No.: WO86/04645
PCT Pub. Date: Aug. 14, 1986

[30] Foreign Application Priority Data
Feb. 5, 1985 [DE] Fed. Rep. of Germany ....... 3503798

[51] Int. Cl.[4] ............................................ F02M 25/06
[52] U.S. Cl. .................................... 123/571; 123/478
[58] Field of Search ................ 123/478, 480, 492, 571

[56] References Cited

U.S. PATENT DOCUMENTS

| | | | |
|---|---|---|---|
| 4,142,495 | 3/1979 | Lahiff | 123/571 |
| 4,191,144 | 3/1980 | Nohira et al. | 123/571 X |
| 4,322,799 | 3/1982 | Kohama et al. | 364/431.06 |
| 4,377,145 | 3/1983 | Nagaishi | 123/494 |
| 4,390,001 | 6/1983 | Fujimoto | 123/571 |
| 4,416,239 | 11/1983 | Takase et al. | 123/478 |
| 4,462,378 | 7/1984 | Atago et al. | 123/571 |
| 4,553,518 | 11/1985 | Takao et al. | 123/571 X |
| 4,636,957 | 1/1987 | Otobe et al. | 123/492 X |
| 4,640,257 | 2/1987 | Kodama et al. | 123/571 |

FOREIGN PATENT DOCUMENTS

2391362 12/1978 France .
2143056 1/1985 United Kingdom .

Primary Examiner—Willis R. Wolfe, Jr.
Attorney, Agent, or Firm—Michael J. Striker

[57] ABSTRACT

A device for affecting operational magnitudes of an I.C. engine having exhaust gas return includes a control device for determining the amounts of fuel to be supplied and of exhaust gas to be recirculated. A control valve in the exhaust gas return conduit is activated to switch in rapid succession the exhaust gas return on and off. Corresponding pressure changes in the intake pipe are detected by a single pressure sensor whose output signals are applied to the control device which uses the difference of the two pressure signals for modifying the amount of fuel and recirculated exhaust gas.

18 Claims, 2 Drawing Sheets

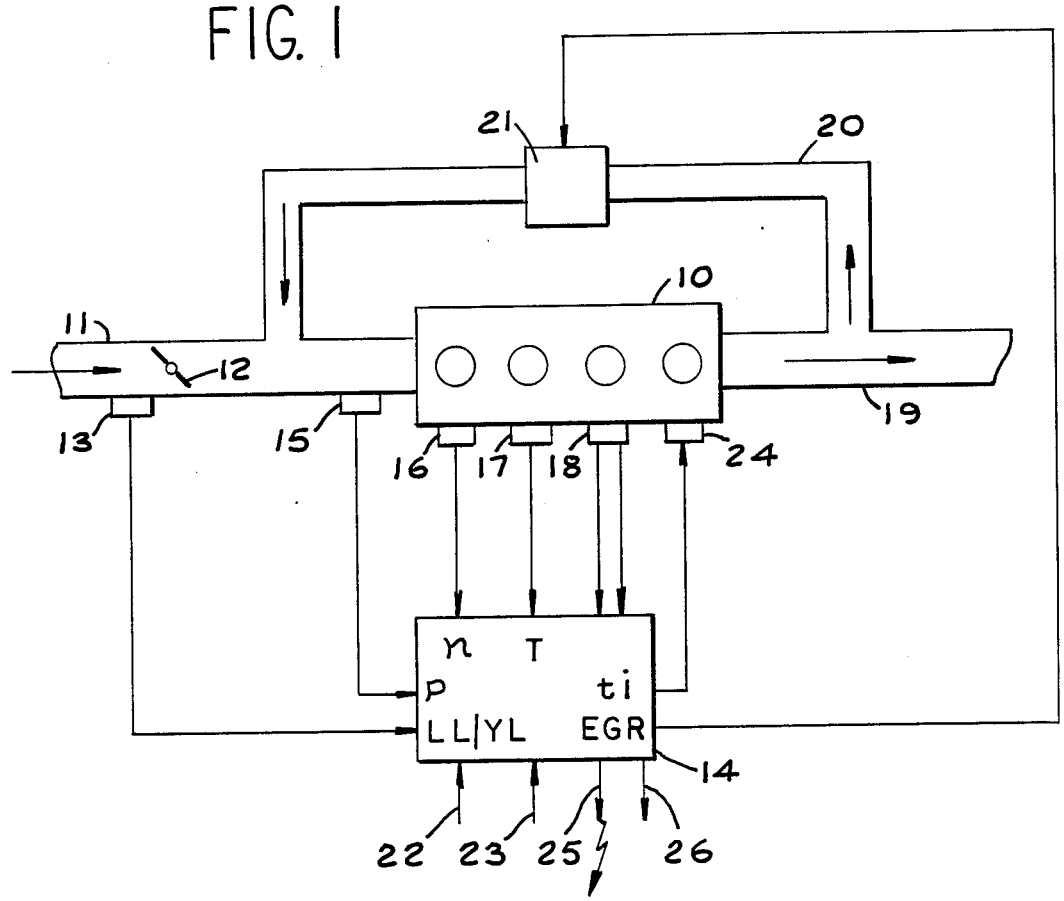

4,762,109

DEVICE FOR AND METHOD OF AFFECTING CONTROL OF OPERATIONAL MAGNITUDES OF INTERNAL COMBUSTION ENGINES HAVING EXHAUST GAS CIRCULATION

STATE OF THE ART

The invention is based on a device or a method for influencing control of operational magnitudes of internal combustion engines having exhaust gas recirculation.

In order to lower the impact on the environment due to the emission of harmful substances from internal combustion engines, a number of measures are available for reducing these harmful substance emissions. All these measures are directed to obtain an optimum exhaust gas quality with smallest changes of serviceability like, for example, fuel consumption, drive capacity, drive characteristic and price. Apart from other methods, in particular the exhaust gas return had been shown to be reliable for reducing the harmful substance emission. Thereby, a portion of the exhaust gases is returned from the exhaust to the intake, whereby the returned amount of exhaust gas is regulated by pneumatic or electrically controlled exhaust gas return valves. As a result of this measure the temperature and the peak pressures are reduced in the combustion chamber and thereby a reduced emission in particular of nitric oxides is achieved.

For example, for the fuel feeding in an internal combustion engine with exhaust gas return a control device is known which is provided with an intake or suction pressure measuring transmitter or sensor for measuring the intake underpressure, a differential pressure-measuring transmitter or sensor for measuring the pressure differential of the pressures in the exhaust gas return conduit and in the intake pipe, a rotary speed meter for picking up the rotary speed of the motor and a device for determining the required amount of fuel which is fed to the motor in dependency on these three measuring magnitudes.

It has been shown to be disadvantageous in this known control device that in addition to the conventional load sensor, which is designed as a pressure sensor, a further sensor must be used for picking up the amount of the returned exhaust gas. This very expensive additional sensor, which is designed as a differential pressure senor, requires additional constructive adjustments on the exhaust gas return pipe, so that its operability be assured.

ADVANTAGES OF THE INVENTION

In contrast thereto, the inventive device for the inventive method of affecting operational magnitudes of internal combustion engines is advantageous in that only a single pressure sensor is used. Such a pressure sensor is anyway provided in pressure-rotary-speed-controlled systems, so that the constructive and mechanical expenditures for installing an exhaust gas return system are reduced to a minimum.

A further advantage when using only a single pressure sensor results from the reduced susceptibility to breakdown of the system.

A very flexible data analysis is made possible by the use of only a single pressure sensor in combination with a control device, wherein the measuring values are further processed. Thereby an uncomplicated adaptation, high reliability and accuracy is assured for different types of internal combustion engines.

Further advantages of the invention are the result of the embodiments of the invention stated in the subclaims. Due to the timely successive measuring of at least two pressure values, in particular during switched on and switched off exhaust gas return the further processing of the measuring signals is simplified, on the one hand, and a control function with respect to the operability of the pressure sensor is exerted, on the other hand.

The averaging of a plurality of pairs of measuring values has to be considered to be very advantageous, because in this manner possible errors caused by dynamic processes can be eliminated. A further advantage is obtained by introducing an adaptive adjustment of the control values responsible for the amount of the return exhaust gas in dependency on operational parameters of the engine. Thus, long time drifting due to aging and contamination, for example, of the exhaust gas return valve, is corrected.

These advantages and further special features or advantageous further embodiments and improvements of the invention are disclosed in the claims in conjunction with the specification of the exemplified embodiment and the drawing.

DRAWING

One exemplified embodiment of the invention is illustrated in the drawing and explained in more detail in the subsequent specification. The drawings show in FIG. 1 a simplified block diagram of the device in accordance with the invention, and FIG. 2 a flow diagram for explaining the method in accordance with the invention.

DESCRIPTION OF THE EXEMPLIFIED EMBODIMENT

The exemplified embodiment relates to a device for influencing operating magnitudes of internal combustion engines. In FIG. 1 an internal combustion engine is desdignated with the reference numeral 10, whereby the fresh air required for combusting the fuel is fed into the engine through an inlet conduit 11. A throttle valve 12 is disposed in the inlet conduit 11. A throttle valve sensor 13 picks up the full load or idling position of the throttle valve and the output of sensor 13 is connected to a signal input LL/VL of a control device 14. Further input magnitudes from a pressure sensor 15, a rotary speed sensor 16, a temperature sensor 17 and a non-specified sensor 18 are fed to corresponding inputs n, p, T of the control device 14. The non-specified sensor 18 may be a knock sensor, an exhaust gas sensor, or the like. The air-fuel-mixture after combustion in the internal combustion engine is discharged through an exhaust conduit 19 into outer atmosphere. An exhaust gas return conduit 20 branches from exhaust conduit 19 and opens into the intake conduit 11 downstream of throttle valve 12. A valve 21 is provided in the exhaust gas return conduit 20 for controlling the amount of exhaust gas being returned from the exhaust conduit 19 to the intake conduit 11.

From the magnitude of underpressure signal delivered by the pressure sensor 15 which is mounted in the intake conduit 11 downstream of the opening of the exhaust gas return conduit 20, of speed proportional signals detected by the rotary speed sensor 16, as well as from other correction magnitudes indicated by arrows 22 and 23 or signals of detected by sensors 17, 18 the control device 14 calculates or selects values for the amounts of fuel to be supplied, which in the special case of an injection system is determined as the opening times $t_i$ for the injection valves 24. However, the invention is not limited to injection systems, be if intake pipe injection or individual cylinder injection, but may also be used for carburetor systems. In addition to other output magnitudes, such as for example, the time of ignition 25 or control magnitudes 26 for an automatic transmission, the control device 14 also determines values for the position of the exhaust gas return valves 21 and outputs corresponding signals.

Referring to the electronic fuel metering systems, which are known for a long time; and which measure the amount of fuel to be allocated in dependency on underpressure in the intake pipe and on rotary speed, in furtherance only the modifications will be explained which in accordance with the invention are designed such as to integrate the additional function of the exhaust gas return feeding. Since the exhaust gas return is completely shut off during many frequently occuring motor operating conditions, for example, during idling, warming up and full load, naturally no operational differences occur under these conditions with respect to a system without an exhaust gas return. When the exhaust gas return is switched off the intake pipe pressure is accordingly picked up and the required amount of fuel is fed to the internal combustion engine 10 by means of the injection valve 24 in condependency on the momentary rotary speed. After switching on the exhaust gas return, in particular during the partial load of the engine, the intake pipe pressure is again picked up and the difference with respect to the previous pressure value without exhaust gas return is determined. The time difference between picking up the two pressure values with and without the exhaust gas return is minute and is only fractions of a second. The two pressure values or the difference thereof are stored in a storage (RAM, EE Prom) and are available for further processing. The difference between the two pressure values not only determines the amount of the required exhaust gas, but also the value of the fresh air as a difference between the total amount of air fed into the internal combustion engine and the amount of returned exhaust gas. By means of this difference value indicative of the amount of fresh air, the amount of fuel to be supplied to the internal combustion engine can be determined. By experimentally picking up the intake pipe pressure with or without exhaust gas return by means of a single pressure sensor one can determine the two unknowns, namely both fresh air and exhaust gas. Moreover, it had been shown to be very advantageous to repeat the aforementioned process several times and to store the obtained pairs of pressure value or differences of the pressure value pairs for a subsequent statistical averaging over a certain period of time depending on operational parometers. This averaging is required primarily to correct dynamic processes which may occur during the switching on of the exhaust gas return. Moreover, it had been shown to be advantageous to store the difference values of the pressure value pairs only in the case when a stationary or substantially stationary operative condition of the engine was present before and after the switching on of the exhaust gas return.

In addition, the determination of the actual value of the returned amount of exhaust gas by the aforedescribed device, permits a transition from a pure control of the exhaust gas return to a regulation of the exhaust gas return. For this purpose adaptive methods are particularly useful, wherein, by way of example, preliminary control values obtained in dependency on operational parameters and stored in a storage readjust by a superimposed regulation the long term drifting of the regulating path. Such adaptive regulating methods are described in detail in German patent application P No. 34 08 215.9 and will not be explained in all detail. In particular the specific structure of the control device provided with a microcomputer and peripheral units for performing such adaptive functions is already known, so that a person skilled in the field of electronic control and regulation of engines can realize such a regulating concept by means of software without problems, once he has knowledge of the subject invention.

In conjunction with the flow diagram of FIG. 2, a schematic plan for the realization of the method in accordance with the invention is provided.

At the start of the program in block 40 the pressure difference Dp(AGR, p) is set to zero. After determination of the condition of the motor, for example, the rotary speed, the load or the different shift positions (block (41), these data are stored in the microcomputer (block 42). After picking up the next motor condition (block 43) the fresh air-pressure is determined in block 44 in accordance with the equation stated in block 44. The microcomputer calculates in block 45 as a function of the fresh air pressure the amount of injection to be supplied and indicates the same as a time duration, for example. The decision making block 46 examines whether the exhaust gas return-valve is closed and if the answer is NO, the program jumps back to block 42 and passes again through the aforedescribed stages up to block 46. However, if the exhaust gas return-valve is closed the pressure differential Dp will be zero (block 47) and in block 48 it is examined whether a stationary or quasi stationary operating condition of the internal combustion engine is present. If this is not the case the program again jumps back to block 42. However, if a stationary or quasi stationary operating condition of the internal combustion engine is present and if the exhaust gas return-valve should be activated (block 49), then value of the instantaneous suction or intake pipe-pressure p (block 50) is stored. If the exhaust gas return-valve should not be actuated the program jumps back to block 42. After storing the intake pipe-pressure (block 50), the rotary speed value and values of different gear shift positions (block 51) and after expiration of a programmable or adjustable delay time, which corresponds approximately to the duration of the exhaust gas return-valve movement (block52), the motor condition is again ascertained in accordance with block 53. After an examination whether the operating parameters of the internal combustion engine remained substantially uniform before or after the actuation of the exhaust gas return-valve, that means, whether a stationary or quasi stationary operation had been present (block 54), the intake pipe pressure p is again stored in accordance with program block 55, provided that a stationary or quasi stationary operating condition had been present. If no stationary or quasi stationary operating condition had been present in the internal combustion engine the program jumps back from block 54 to block 41 and the program starts again. According to block 56 the pressure difference in the intake pipe vacuum pressure with and without exhaust gas return is ascertained and according to block 57 it is stored after a plausibility test in dependency on the exhaust gas return-valve movement and the intake pipe pressure. This plausibility test is required to eliminate measuring errors caused by dynamic processes which may have occurred during the switching on of the exhaust gas return. This plausibility, in its simplest form consists in comparing the values of the difference pressure with predetermined threshold values and eliminating pressure values outside of a certain tolerance range from further processing. Furthermore, it had been shown to be advantageous to store the actual pressure difference values Dp in a performance graph or field of characteristics by means of an adaptive regulating method. In this context reference is made to German patent application P No. 34 08 215.9. Subsequently, a comparison of the instantaneous with the preceding pressure differential Dp (EGR, p) is made followed by a statistic averaging, for example. Thereafter, the program jumps back to block 42 and the described program flow starts again from the beginning.

Since the drifting of the amount of the exhaust gas return is noticeable only over a long period of time (contamination of the exhaust gas return valve) and since the absolute the returned amount of exhaust gas up to 20% to 30% still represents only a correcting magnitude, a very rapid converging of such an adaptive process can be expected. In particular, this is due to the fact that the switching on and switching off of the exhaust gas return occurs very frequently during normal driving operation.

In general, it is advantageous in the inventive device or the inventive method that the determination of load pick up is made possible by means of a single, very simple and thereby costeffective sensor, and that the exact amount of the returned exhaust gas can be determined, which has not always been possible even with exhaust gas return valves which are equipped with position sensors.

I claim:

1. Method for influencing operational magnitudes of internal combustion engines inclusive of the rotary speed (n) and the intake pipe pressure used for determining the amount of fuel to be allocated to the engine and wherein a return of exhaust gases into an intake conduit of the internal combustion engine is provided, comprising the steps of measuring two values of the intake pipe pressure during successively switched on and switched off exhaust gas return and using the two pressure values to determine the actual value of the returned amount of exhaust gas or the amount of fuel to be allocated for the internal combustion engine.

2. Method in accordance with claim 1, characterized in that the actual value of the returned amount of exhaust gas is used for regulating the rate of exhaust gas returned.

3. Method in accordance with claim 1 wherein the at least two pressure values are measured a few times and the average thereof is subsequently statistically determined.

4. Method in accordance with claim 1, wherein the at least two pressure values are further processed only during the presence of stationary or quasi stationary operating conditions of the internal combustion engine during the measuring of the two values.

5. Method in accordance with claim 1, characterized in that the at least two measuring values are picked up a few times and that the average is subsequently statistically determined.

6. A device for affecting the control of operational magnitudes of an internal combustion engine having an intake conduit provided with a throttle valve, a discharge conduit for exhaust gases and an exhaust gas return conduit connecting the discharge conduit with the intake conduit downstream of the throttle valve, a control valve arranged in the exhaust gas return conduit for controlling or regulating the amount of returned exhaust gas, a single pressure sensor for measuring pressure (p) in the intake conduit downstream of the throttle valve, and means for measuring additional operational magnitudes inclusive of rotary speed (n) of the engine, the device comprising control means for receiving and processing input signals corresponding to measured magnitudes of at least rotary speed (n) and pressure (p) and generating output signals for controlling in dependency on at least the rotary speed input signal the amount of fuel to be supplied to the engine and the amount of exhaust gas to be returned in the intake conduit, the control means processing at least two input pressure signals for affecting the generation of output signals, and further comprising means for switching on and off the control valve at least one time for each of the operational magnitudes to apply via the single pressure sensor to the control means two pressure signals detected during the successive switching of the control valve; and the control means forming a difference value of the two pressure signals for affecting the generation of the output signals.

7. A device as defined in claim 6 wherein mid control means includes storage means for storing the difference of the two pressure signals.

8. A device as defined in claim 6 wherein said control means processes said input signals only then if a stationary or quasi stationary operating condition of the engine has been present during the time period of the measurement of the operational magnitudes of the engine inclusive of the same rotary speed during the sensing of the two pressure signals at switched on/off conditions of the control valve.

9. A device as defined in claim 6 wherein said control means is a computer.

10. A device as defined in claim 6 wherein the additional operational magnitudes are measured and supplied to the control means during both the switched-on and the switched-off condition of the control valve.

11. A device as defined in claim 10 wherein the control means determines the amount of air to be passed through the intake conduit from at least two operational magnitudes measured during the switched-on and switched-off conduits of the control valve.

12. A device as defined in claim 6 wherein the control means determines the actual amount of return gas from the difference of at least two operational magnitudes.

13. A device as defined in claim 12 wherein said storage means stores a plurality of pairs of the pressure signals.

14. A device as defined in claim 6 further comprising means for storing at least the two pressure signals.

15. device as defined in claim 14 further comprising means for averaging the stored pressure signals.

16. A device as defined in claim 15 wherein said averaging means perform statistical averging.

17. A device as defined in claim 6 further comprising means for regulating the exhaust gas return and means for applying to the regulating means the two pressure signals for controlling the exhaust gas return in such a manner as to neutralize drifting in the regulating loop.

18. A device as defined in claim 17 comprising means for delivering preliminary control values for the exhaust gas return in dependency on the operational magnitudes; and means for adaptive adjustment of the regulating process in such a manner that the drifting in the regulating loop is neutralized.

* * * * *